June 9, 1953  W. F. BORN ET AL  2,641,636
BUS DUCT AND PLUG-IN UNIT
Filed Dec. 10, 1949  2 Sheets-Sheet 1

WITNESSES:
Edward Michaels

INVENTORS
William F. Born &
Joseph C. Langaunet.
BY
ATTORNEY

June 9, 1953 W. F. BORN ET AL 2,641,636
BUS DUCT AND PLUG-IN UNIT
Filed Dec. 10, 1949 2 Sheets-Sheet 2

WITNESSES:
Edward Michaels

INVENTORS
William F. Born &
Joseph C. Langaunet.
BY
G. M. Crawford
ATTORNEY

Patented June 9, 1953

2,641,636

UNITED STATES PATENT OFFICE 2,641,636

BUS DUCT AND PLUG-IN UNIT

William F. Born and Joseph C. Langaunet, Beaver, Pa., assignors to Westinghouse Electric Corporation, East Pittsburgh, Pa., a corporation of Pennsylvania Application December 10, 1949, Serial No. 132,348

4 Claims. (Cl. 175—307)

Our invention relates, generally, to bus ducts for electrical distribution systems, and, more particularly, to a bus duct of the plug-in type in which plug-in or power takeoff units are removably attached to the duct housing.

It is the usual practice to provide each plug-in unit with contact members, commonly called stabs, which engage the bus bars inside of the bus duct housing when the plug-in unit is in its operating position on the duct housing. Since the stabs and connections thereto are energized when they engage the bus bars, it is desirable to prevent access to the energized parts of the plug-in unit. Also, since it is difficult to insert the stabs on the bus bars without being able to see the bars, it is desirable that both the stabs and the bus bars be visible to the operator while the plug-in unit is being installed on the duct housing.

An object of our invention is to prevent access to the parts of a bus duct plug-in unit which become energized when the unit is installed on the duct housing without obscuring the view of the operator while installing the unit.

A more general object of our invention is to provide a bus duct plug-in unit which shall be simple in operation and which may be economically manufactured and installed.

Other objects of our invention will be explained fully hereinafter or will be apparent to those skilled in the art.

In accordance with one embodiment of our invention, a transparent barrier is so disposed in a bus duct plug-in unit that the connector stabs and the bus bars are visible through the barrier and an opening in the bottom of the unit while the unit is being installed on the duct housing. The barrier prevents access to energized parts after the unit is installed.

For a better understanding of the nature and objects of our invention, reference may be had to the following detailed description, taken in conjunction with the accompanying drawings, in which.

Figure 1:
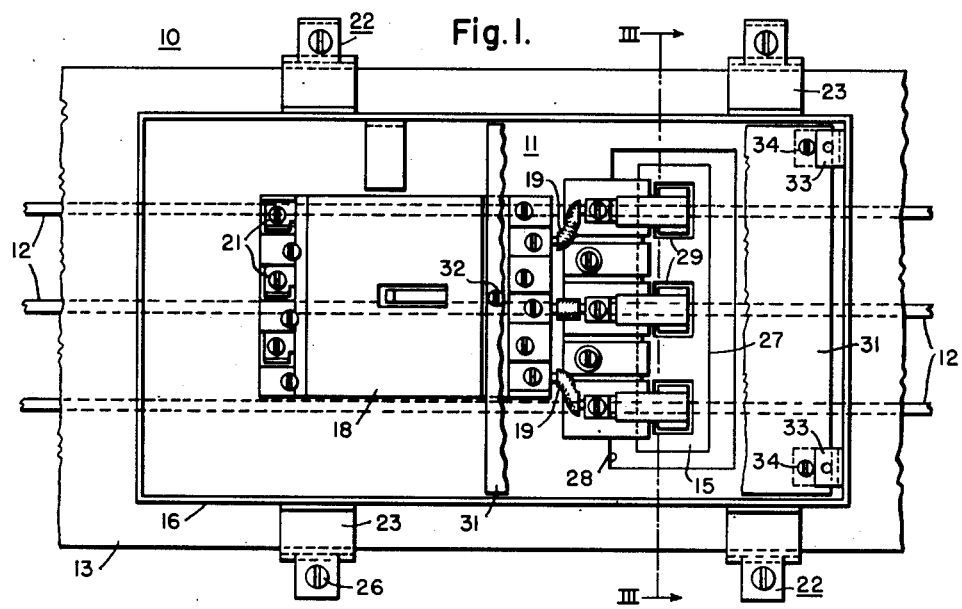
Figure 1 is a view, in plan, of a portion of a bus duct with a plug-in unit installed thereon, parts of the plug-in unit being removed or broken away for clearness.

Referring to the drawings, the structure shown therein comprises a bus duct 10 having a plug-in unit 11 mounted thereon. The bus duct 10 is of the plug-in type having a plurality of bus bars 12 which are so disposed within a metal housing or duct 13 that they may be engaged by contact members 14, which are commonly called stabs, provided on the plug-in unit 11. The bus bars 12 are supported by suitable insulating members 15 which are usually located at regular intervals along the duct.

Figure 2:
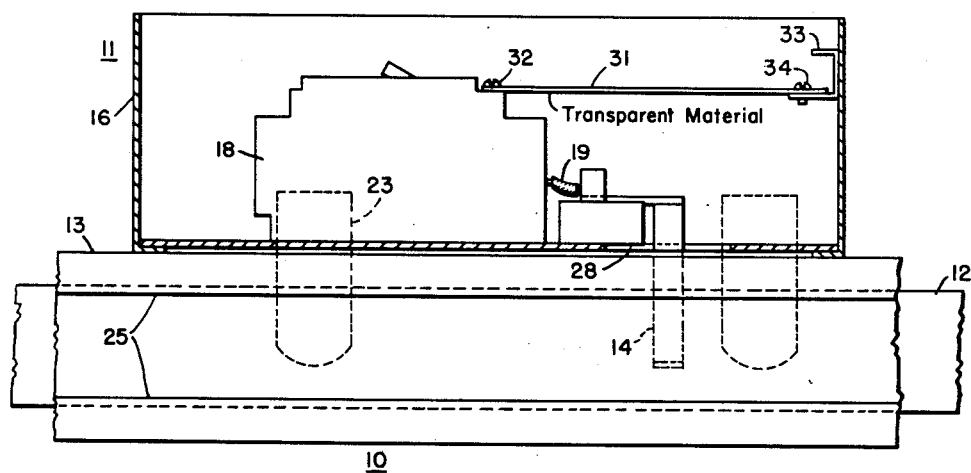
Fig. 2 is a view, partly in side elevation, and partly in section of the structure shown in Fig. 1.
Figure 4:
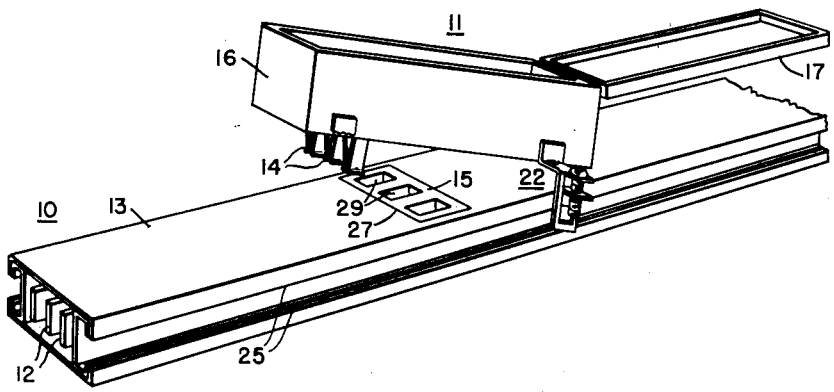
Fig. 4 is a view, in perspective, of a plug-in unit partially installed on a bus duct housing.

The plug-in unit 11 comprises a metal housing 16 having a removable or openable cover 17, shown only in Fig. 4. A circuit interrupting device 18, which may be an automatic circuit breaker, is mounted inside the housing 16 and is electrically connected to the contact members or stabs 14 by circuit connections 19, as shown in Figs. 1 and 2. In this manner the circuit breaker 18 is connected to the bus bars 12 when the plug-in unit 11 is in the operating position on the duct or housing 13. It will be understood that terminal connections 21 on the circuit breaker 18 may be connected by suitable conductors to power consuming machines or other electrical apparatus.

Figure 3:
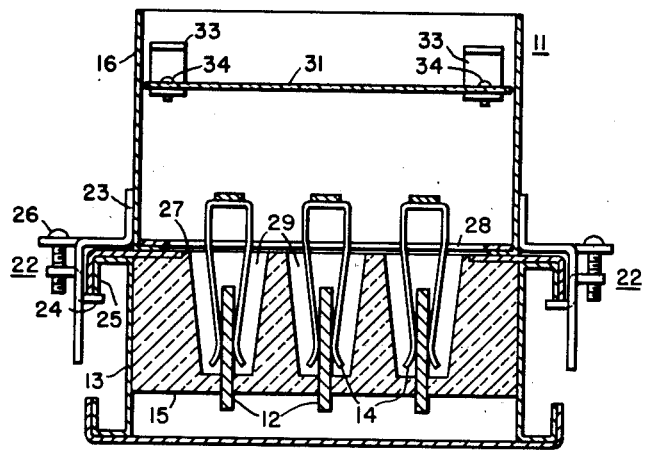
Fig. 3 is a sectional view, taken along the line III—III of Fig. 1.

In accordance with the usual practice the plug-in unit 11 may be clamped directly to the duct housing 13 by means of clamping devices 22 which may be of the type disclosed in the copending application of E. O. Krance and G. J. Freese, Serial No. 763,966, filed July 26, 1947. As shown most clearly in Fig. 3, each clamping device 22 comprises a T-shaped bracket 23 which is secured to a side of the housing 16 and a clamping member 24 which engages a flange 25 on the bus duct housing 13. A screw 26 is provided in the bracket 23 for retaining the clamp 24 in engagement with flange 25.

As shown most clearly in Figs. 1 and 2, the insulator 15 is disposed in an opening 27 in the top of the bus duct housing 13 and the stab connectors 14 extend through an opening 28 in the bottom of the plug-in unit housing 16 which is in alignment with the opening 27 in the bus duct housing. The insulator 15 is provided with openings 29 into which the stabs 14 are inserted to engage the bus bars 12.

As explained hereinbefore, the stab connectors 14 and the circuit connections between the connectors 14 and the circuit breaker 18 are energized when the stab connectors engage the bus bars. It will be understood that the terminal connections 21 are energized only when the contact members of the circuit breaker 18 are closed.

In order to prevent access to the stab connectors 14 and the electrical connections 19 when the plug-in unit 11 is installed on the bus duct housing, an insulating barrier 31 is mounted inside the housing 16 above the stab connectors 14. The barrier 31 may be attached to the circuit breaker 18 by a screw 32 and to brackets 33 by screws 34. The brackets 33 may be secured to one end of the housing 16 by welding or in any other suitable manner.

As explained hereinbefore, it is difficult to properly align the stab connectors 14 with the bus bars 12 when installing the plug-in unit 11 on the bus duct housing 13. In order to overcome this difficulty the barrier 31 is made from a transparent material, preferably a transparent plastic, thereby making the stab connectors 14 and the bus bars 12 visible through the barrier 31 and the openings 28 and 27 in the plug-in unit housing 16 and the bus duct housing 13, respectively. In this manner the stab connectors 14 may be readily aligned with the bus bars 12 and inserted through the openings 29 in the insulator 15 to engage the bus bars, after which the plug-in unit may be clamped to the bus duct housing by means of the clamps 22.

From the foregoing description it is apparent that we have made it possible for plug-in units to be easily and readily installed on bus duct housings and at the same time have provided for protecting the operator from coming in contact with energized parts of the apparatus during or after the installation of a plug-in unit. The transparent barrier herein described may be utilized with plug-in units of various types such as those having automatic circuit breakers or manually operable switches therein.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. The combination with a bus duct housing having an opening therein providing access to bus bars within the housing, of a plug-in unit comprising a metal housing having an openable cover on the front thereof and an opening through the back thereof with stab connectors extending through the opening in the back of the housing for engaging the bus bars, edges of the opening in the back of the plug-in unit housing being spaced from the stab connectors to provide an opening substantially larger than the cross-sectional area of the stab connectors, thereby affording a view of the outer ends of the connectors when looking into the housing and through the opening in the back thereof, a barrier disposed within the plug-in unit housing beneath the cover thereof, said barrier extending across the stab connectors to protect the inner ends of the connectors when the cover of the housing is open, and said barrier being composed of transparent material and disposed over the opening in the plug-in unit housing to make the stab connectors and the bus bars visible through the barrier and the openings in the plug-in unit housing and the bus duct housing when said openings are substantially aligned.

2. The combination with a bus duct housing having an opening therein providing access to bus bars within the housing, of a plug-in unit comprising a metal housing having an openable cover on the front thereof and an opening through the back thereof with stab connectors extending through the opening in the back of the housing for engaging the bus bars, a circuit interrupting device disposed in the plug-in unit housing and electrically connected to the stab connectors, at least one edge of the opening in the back of the plug-in unit housing being spaced from the stab connectors to provide an open area substantially larger than the cross-sectional area of the stab connectors, thereby affording a view of the outer ends of the connectors when looking into the housing and through the opening in the back thereof, a barrier disposed inside the plug-in unit housing beneath the cover thereof, said barrier extending across the stab connectors to protect the inner ends of the stab connectors when the cover of the housing is open, and said barrier being composed of transparent material and disposed over the opening in the plug-in unit housing to make the stab connectors and the bus bars visible through the barrier and the openings in the plug-in unit housing and the bus duct housing.

3. A bus duct plug-in unit comprising a metal housing having at least one opening through the back thereof with a stab connector extending through the opening, a circuit interrupting device disposed in the housing and electrically connected to the stab connector, an openable cover on the front of the housing providing access to said device, at least one edge of the opening in the back of the housing being spaced from the stab connector to provide an open area substantially greater than the cross-sectional area of the connector, thereby affording a view of the outer end of the connector when looking into the housing and through the opening in the back thereof, a barrier disposed inside the plug-in unit housing beneath the cover thereof, said barrier extending across the stab connector to protect the inner end of the stab connector when the cover is opened, and said barrier being composed of transparent material and disposed over said opening to make the outer end of the stab connector visible through the barrier and the opening in the housing when said cover is opened.

4. A bus duct plug-in unit comprising a metal housing having an opening through the back thereof with stab connectors extending through the opening, an enclosed circuit interrupting device disposed in the housing, an openable cover on the front of the housing providing access to said device, electrical connections between one end of the interrupting device and the inner ends of the stab connectors, edges of the opening in the back of the housing being spaced from the stab connectors to provide an opening substantially greater than the cross-sectional area of the stab connectors, thereby affording a view of the outer ends of the connectors when looking into the housing and through the opening in the back thereof, a barrier mounted inside the plug-in unit housing beneath the cover thereof, said barrier being disposed between a wall of the housing and the interrupting device thereby protecting the inner ends of the stab connectors and said electrical connections but permitting access to the interrupting device when said cover is opened, and said barrier being composed of transparent material and disposed over said opening to make the outer ends of the stab connectors visible through the barrier and the opening housing when said cover is opened.

WILLIAM F. BORN.
JOSEPH C. LANGAUNET.

References Cited in the file of this patent

UNITED STATES PATENTS

| Number | Name | Date |
| --- | --- | --- |
| 1,710,258 | Hume | Apr. 23, 1929 |
| 1,900,595 | Weber | Mar. 7, 1933 |
| 1,954,186 | Steinmayer | Apr. 10, 1934 |
| 2,088,105 | Frank | July 27, 1937 |
| 2,361,179 | De Mask | Oct. 24, 1944 |
| 2,466,930 | Cook | Apr. 12, 1949 |
| 2,492,490 | Lindae | Dec. 27, 1949 |